United States Patent [19]

Green

[11] Patent Number: 4,911,590

[45] Date of Patent: Mar. 27, 1990

[54] AUTOMOBILE LOADING RACK AND METHOD FOR LOADING INTO CONTAINERS

[75] Inventor: Charles T. Green, San Ramon, Calif.

[73] Assignee: American President Companies, Ltd., Oakland, Calif.

[21] Appl. No.: 198,423

[22] Filed: May 25, 1988

[51] Int. Cl.⁴ .............................................. B60P 3/08
[52] U.S. Cl. ........................................ 410/26; 410/29; 414/229
[58] Field of Search ................... 410/4, 13, 14, 15, 24, 410/26, 29, 29.1; 211/168, 191; 414/229

[56] References Cited

U.S. PATENT DOCUMENTS

| | | | |
|---|---|---|---|
| 1,282,766 | 10/1918 | Daly | 410/14 |
| 2,432,228 | 12/1947 | De Lano | 410/26 |
| 2,461,927 | 2/1949 | Schaldach et al. | 410/26 |
| 2,993,725 | 7/1961 | Van Keuren | 410/29.1 X |
| 3,387,722 | 6/1968 | Fisher, Sr. et al. | 414/229 |
| 3,902,613 | 9/1975 | Newland | 410/26 X |
| 4,239,275 | 12/1980 | Horneys et al. | 410/26 X |
| 4,701,086 | 10/1987 | Thorndyke | 410/26 |
| 4,738,575 | 4/1988 | Blodgett et al. | 410/26 X |
| 4,749,317 | 6/1988 | Daniel | 410/26 |
| 4,786,222 | 11/1988 | Blodgett | 410/29 |

FOREIGN PATENT DOCUMENTS

| | | | |
|---|---|---|---|
| 518839 | 11/1955 | Canada | 410/26 |
| 1188175 | 9/1959 | France | 410/26 |
| 402228 | 11/1933 | United Kingdom | 14/69.5 |

Primary Examiner—Margaret A. Focarino
Assistant Examiner—Gary C. Hoge
Attorney, Agent, or Firm—Townsend and Townsend

[57] ABSTRACT

A method and apparatus for loading and carrying a maximum number of automobiles in a standard intermodal shipping container. The method utilizes an automobile supporting rack which is readily installed in a container and includes an inclined ramp upon which an automobile is driven from the floor of the container onto the ramp, the lower end of the ramp is then lifted to and secured in an upward generally horizontal position, and a second automobile is driven under the first automobile supported on the elevated ramp. The method includes sequentially loading automobiles on similar racks until the container is filled with six automobiles in three stacks of two automobiles each. The invention also includes an auxiliary ramp, upright sidewall frames for supporting the ramp, and locking means for locking the ramp in the upper position. The ramp and side frames are symmetrical. Automobiles are unloaded from the container in the reverse of the loading procedure.

10 Claims, 4 Drawing Sheets

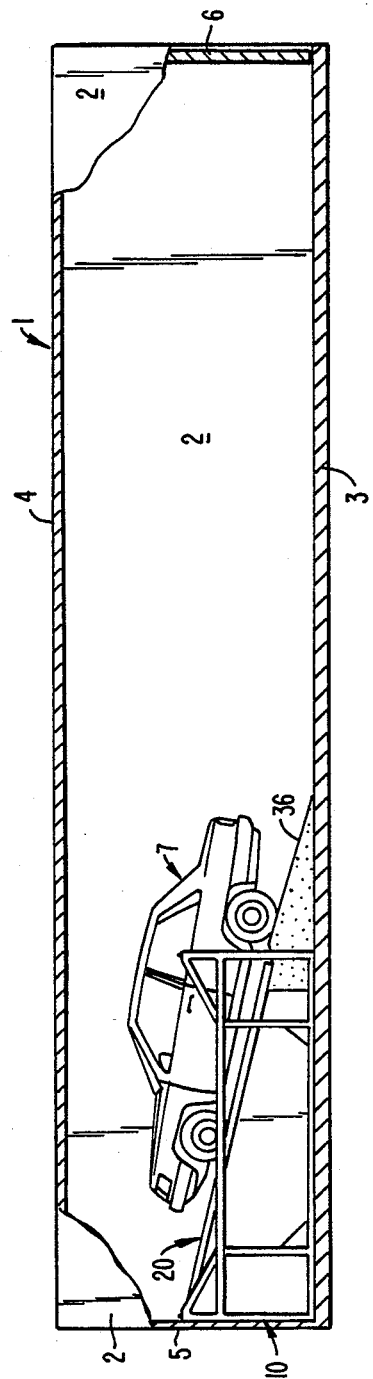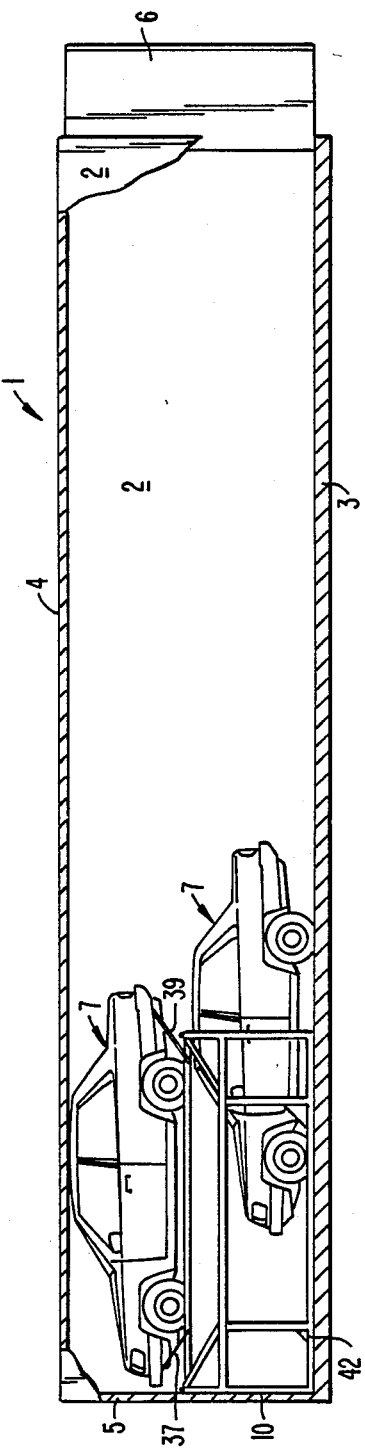

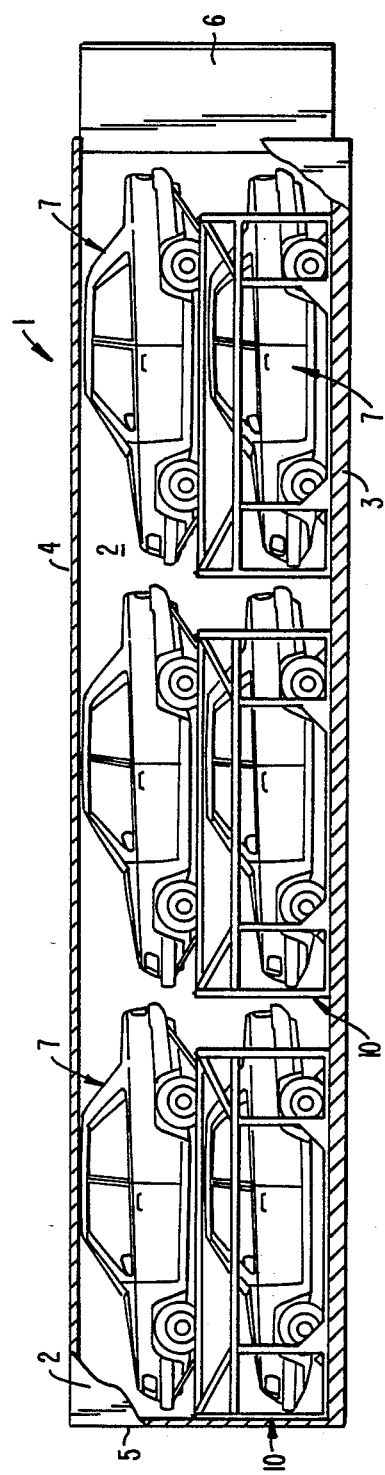

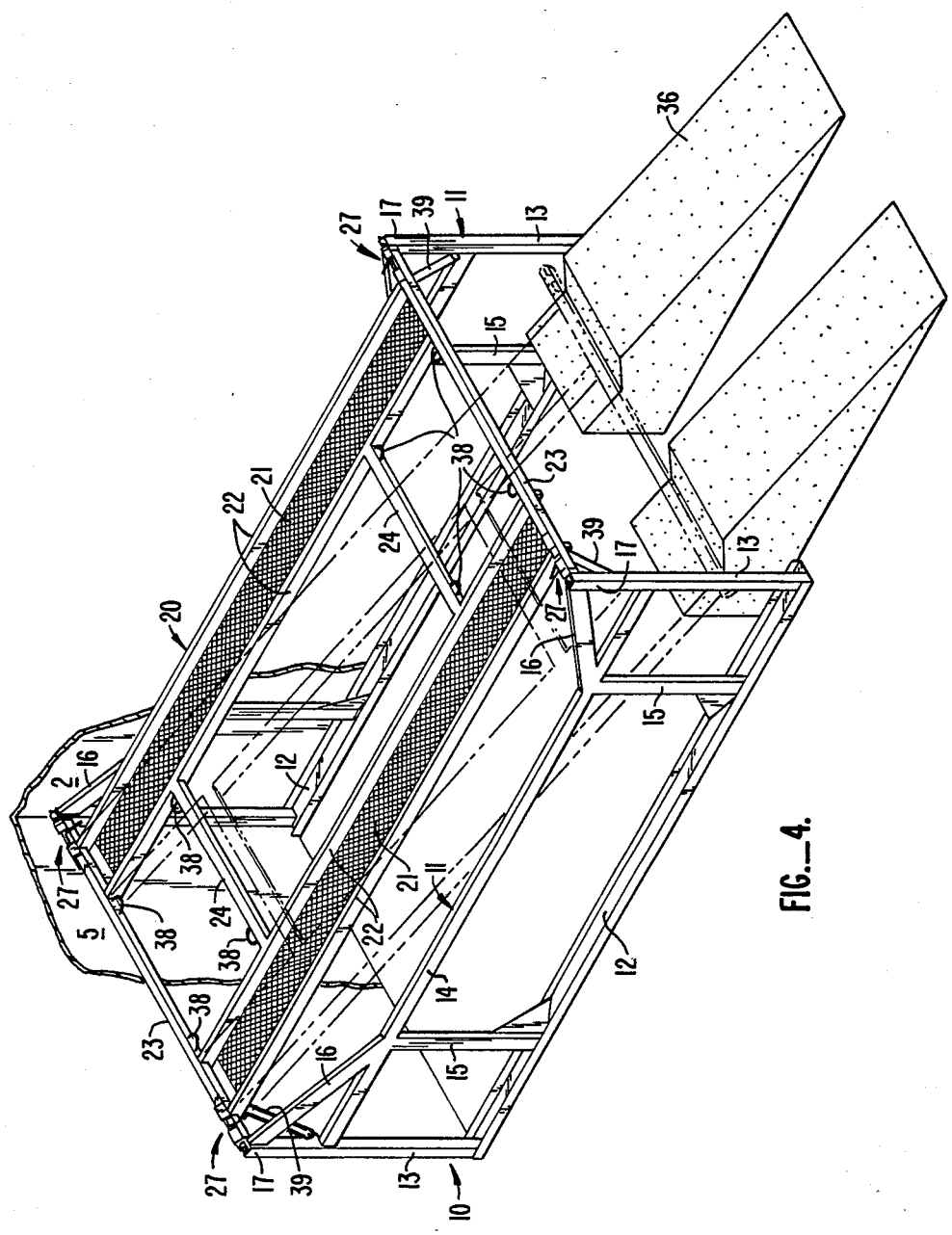
FIG._4.

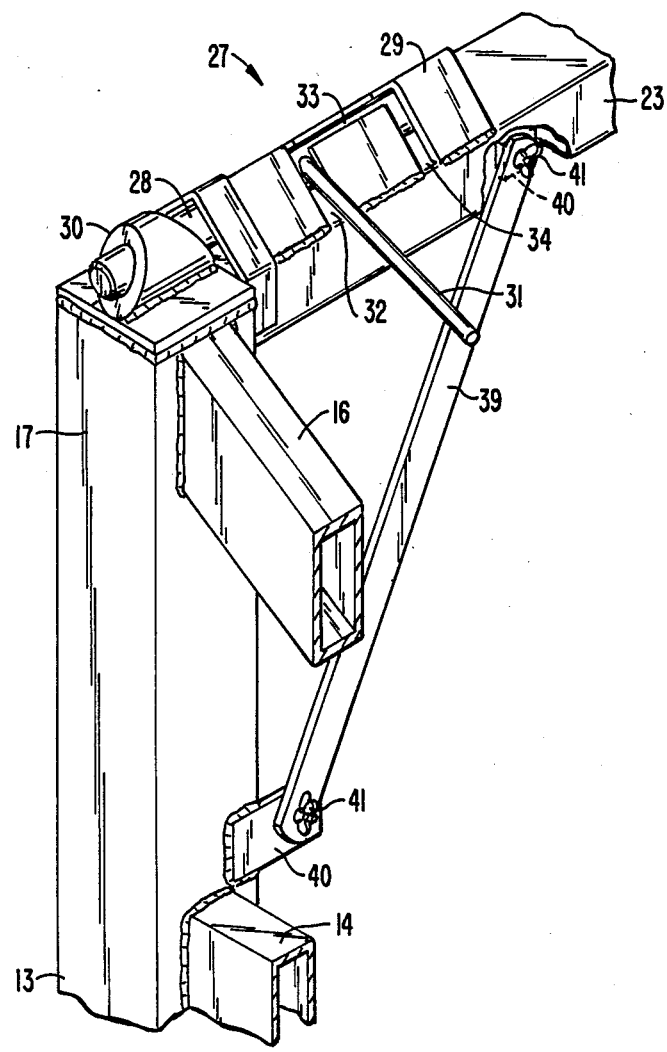
FIG._5.

4,911,590

AUTOMOBILE LOADING RACK AND METHOD FOR LOADING INTO CONTAINERS

BACKGROUND OF THE INVENTION

This invention relates to a rack assembly and a method for loading a maximum number of automobiles into a conventional intermodal shipping container.

Various attempts have been made to maximize the number of automobiles to be transported in conventional intermodal containers of the type that are used for shipping dry cargo via trailers, railroad cars, and containerships. Among the more recent of those attempts are disclosed in the patents to Paulyson 4,343,401, in which the upper two automobiles are supported on temporary decks installed in a 40-foot container over two automobiles loaded on the container floor. Van Iperen 4,371,298 and Canellis 4,310,271 disclose systems for tilting and partly overlapping three automobiles in a standard container.

These systems, however, are limited as to the number of automobiles that can be loaded into the container and involve structures and loading and unloading methods of various complexities.

SUMMARY OF THE INVENTION

In recent years the 45-foot intermodal container has become more of a standard. The present invention provides an automobile rack that may be readily assembled in such a container for loading two automobiles, one above the other in a stack at one end of the container. Although the extension of the container from 40 to 45 feet long would not ordinarily accommodate a third stack of automobiles, the rack and loading method of this invention permits utilization of essentially the entire volume of the container to be loaded with six automobiles, i.e., three stacks of two automobiles each.

The rack of this invention is so constructed as to be readily assembled and utilized in the method of loading and unloading automobiles by relatively inexperienced and untrained personnel. After the automobiles have been unloaded at their destination, the same type of personnel will be able to disassemble and conveniently store the rack in a compact form for return shipment.

It is therefore an object of this invention to provide a relatively simple rack for loading, storing in a container for shipment, and unloading a maximum number of automobiles.

Another object of this invention is the provision of a simplified method of loading and unloading a maximum number of automobiles to and from a conventional intermodal, dry cargo container.

It is yet another object of this invention to provide a rack assembly which may be readily assembled for loading and disassembled after unloading automobiles in an intermodal container.

Other objects and advantages will become apparent from the following description taken in connection with the accompanying drawings.

BRIEF DESCRIPTION OF THE DRAWINGS

FIG. 1 is a side elevational view of a container with the near side broken away, showing the initial step of the preferred embodiment of the method of this invention in loading automobiles;

FIG. 2 is a side elevational view of a container similar to FIG. 1, showing a subsequent step in the method of loading automobiles;

FIG. 3 is a side elevational view of a container similar to FIG. 1, showing the container after performance of all the steps of the preferred embodiment, in which the container is fully loaded with automobiles;

FIG. 4 is a perspective view of the automobile rack of this invention for use in loading, unloading and supporting automobiles in the container, showing the automobile ramp in its loading and unloading position in dot dash-lines; and, FIG. 5 is a perspective view of the locking means of FIG. 4 for locking the ramp in its upper, horizontal position.

DETAILED DESCRIPTION OF PREFERRED EMBODIMENTS

Referring to FIGS. 1–3, there is illustrated a conventional dry cargo, intermodal shipping container, generally designated 1, having upstanding, opposed sidewalls 2, a floor 3, top 4, closed endwall 5 at one end, and doors 6 at the opposite end. Container 1 illustrated in this embodiment is of standard outside dimensions, 45 feet long by 8 feet wide by 9½ feet high. Such a standard container is conventionally loaded and unloaded through doors 6 for the purpose of shipping dry cargo by land over the road when the container is supported on a trailer chassis and pulled by tractor, by rail on flat cars, and overseas loaded on a containership.

For purposes of this invention, container 1 is intended to be loaded with six automobiles of approximate dimensions of 170 inches long and 53 ½ inches high from tires to roof. Such automobiles as the PROTON "SAGA" (manufactured in Malaysia), FORD "MUSTANG" and "CORSI" are examples of automobiles intended to be loaded in container 1 in three columns or stacks of two-automobiles each as shown in FIG. 3.

In order to accomplish this result, there are provided three identical automobile racks, generally designated 10, illustrated in detail in FIG. 4. Racks 10 are each approximately the length of an automobile to be loaded and are comprised of a pair of opposed sidewall frames 11, including an elongated, horizontal base channel 12, spaced, opposed vertical end posts 13, an intermediate horizontal rail 14 spaced upwardly from base 12 and secured at its ends to posts 13, intermediate vertical supports 15, and angle braces 16 secured between the upper ends 17 of posts 13 and rail 14. Frames 11 are preferably symmetrical and a pair thereof are adapted to be installed in spaced, opposed relation adjacent opposite sidewalls 2 of container 1. When so installed the spacing between frames 11 is approximately the inside width of the container and more than the width of a typical automobile 7.

Each rack 10 includes a ramp 20 (FIG. 4) adapted to support an automobile on its wheels. Ramp 20 comprises a pair of opposed, elongated wheel-bearing ramp tracks 21 spaced apart approximately the track width of an automobile 7. Tracks 21 are each wide enough to accommodate the tires on a variety of vehicles to be supported thereon and are provided with upstanding side guides 22 at each edge thereof.

Ramp tracks 21 are maintained in spaced relation by securement to elongated, opposed end rails 23 and intermediate rails 24. The ends of rails 23 project outwardly from opposite edges of tracks 21 of ramp 20 so that the overall length of said end rails is substantially the same as the spacing between sidewall frames 11 when the latter are installed in the container. Ramp 20 is likewise preferably symmetrical about both horizontal axes and is provided at its four corners at the ends of end rails 23 with pivotal locking means, generally designated 27 (FIGS. 4, 5).

Locking means 27 provide the dual function of hingedly connecting the ends of ramp 20 to the upper ends 17 of frames 11, and when one end is unlocked it may be swung or tilted between an inclined position (FIG. 1, dot-dash position in FIG. 4) in which an automobile may be driven onto it from the floor 3 of the container 1 (FIG. 1) and a generally horizontal position supporting the automobile above rack 10 (FIG. 2).

Each locking means (FIG. 5) comprises an elongated bolt 28 aligned with and slidably supported in a housing 29 at the outer end of each end rail 23 of ramp 20. Each bolt 28 is thus supported for throwing from a retracted position within housing 29 to a locking position projecting beyond the end of end rail 23 (FIG. 5) into a tubular keeper 30 secured to the upper end 17 of each end post 13 of sidewall frames 11. Bolt 28 is retained in its projected position by movement of a handle 31 affixed thereto residing in a transverse slot 32 in housing 29 and is retracted by lifting handle 31 passing it via communicating slot 33 and into transverse slot 34 to retain the bolt in its retracted position. When all four bolts 28 are in the projected positions in keepers 30, ramp 20 is maintained in the horizontal position at the top of rack 10 (FIGS. 3, 4).

In operation according to the method of this invention, a pair of sidewall frames 11 are installed against the opposite sidewalls 2 of the container 1 at the forward end against endwall 5. The base channels 12 may be nailed to the floor 3 of the container to secure frames 11 tightly against sidewalls 2.

Ramp unit 10 is then located with its front end adjacent the front end of sidewall frames 11 at front end 5 of the container and bolts 28 are thrown into keepers 30 so as to lock the front end of the ramp 20 to the front end of sidewall frames 11. The rear end of the first ramp 20 is then lowered into a position adjacent the floor 3 of the container 1. Wedge-shaped auxiliary ramps 36, constructed of compacted foam or the like, may be positioned under the rear ends of tracks 21 of ramp 20 (FIGS. 1, 4) to provide a substantially continuous incline from the floor 3 of the container to the upper forward ends of tracks 21 that is not as steep as the incline would be if the rear ends of tracks 21 were resting on the floor 3.

The first automobile 7 is then driven or rolled on its wheels up ramps 36, 20 until the front bumper is approximately six inches from the front end of the ramp (FIG. 1). The emergency brakes and transmission of the automobile 7 are then placed in "park" position, the rear end of ramp 20 with the automobile in position is lifted to just below the horizontal and auxiliary ramps 36 are removed. The automobile is then secured, as by lashing to the ramp 20 by means of conventional lashing straps 37 (FIG. 2) connected between the lashing ring 38 located beneath the front and rear bumpers of the automobile and the lashing rings secured to end rails 23 or intermediate rails 24 between tracks 21 of ramp 20 (FIG. 4).

The ramp is then lifted to a position in which the rear end rail 23 is adjacent the upper ends 17 of the rear end posts 13 and the bolts 28 thrown into engagement with keepers 30 to maintain the ramps and the automobile in the elevated position of FIGS. 1 and 4. In this position, diagonal braces 39 are connected between pad eyes 40 (FIG. 5) secured to each end post 13 and each end rail 23 of ramp 20 by wing nuts 41 in order to further stabilize the auto rack assembly 10.

Next, the second automobile 7 (FIG. 2) is driven or rolled on the floor 3 of the container under the first automobile on ramp 20 to approximately six inches from the front endwall 5 of the container and its emergency brakes and transmission are placed in "park" position. The second automobile may be further secured by having its wheels chocked by conventional chocks (not shown) nailed to the floor 3 of container 1.

In some cases, depending upon the overall height of the automobiles 7, it may be desirable to lower the air pressure of all four tires to the lowest driveable level. Of course, all antennae should be in their lowest contacted positions.

The next rack assembly is then positioned approximately 20 inches from the first rack assembly 10 and the loading procedure is repeated. Approximately six inches should be maintained between the bumpers of the first stack of automobiles on the first rack 10 and the second stack of automobiles.

The loading process is repeated for the third rack 10 and stack of automobiles 7 so that the container is fully loaded with three stacks of two automobiles each (FIG. 3).

The unloading process is essentially the reverse of the loading process. The last, lower automobile 7 is backed out of the doors 6 of the container, the ramp on the last automobile rack 10 is lowered to auxiliary ramps 36 and that automobile backed down the ramps and out of the container. After disassembly and removal of the last auto rack 10, the procedure is repeated until all automobiles have been unloaded from the container.

Although the components of the rack 10 may be easily handled by two men, it is probably more advisable to lift and place them with the aid of a fork lift truck, which should also be used to lift and lower the inclined ramp with the automobile 7 on it to and from the horizontal position.

The construction of racks 10 is such that they may be readily assembled, operated and assembled by relatively unskilled personnel.

Because the automobile racks 10 may be readily disassembled into their component parts, ramps 20 and sidewall frames 11, they can be easily stacked and stored for reuse or shipped in the container, in which they will occupy little space, for the return voyage from the automobile-unloading port. Disassembling the racks 10 merely requires retracting the bolts 28 and locking means 27, removing ramp 20 and pulling sidewall frames 11 from the opposing walls 22 of the container in the reverse order of which they were assembled. Of course, stabilizing braces 39 should also be removed and auxiliary ramps 36 may also be readily stored with the remainder of the racks.

Although preferred embodiments of the invention has been described in detail, such description should not be taken as limiting the invention beyond the spirit and scope of the appended claims.

I claim:

1. A method of loading automobiles into a standard intermodal, dry cargo shipping container, comprising:
    (a) installing at one end on the floor of the container, a removable automobile-supporting rack having a tiltable ramp, one end of which is hingedly supported on said rack spaced above the floor of the container by more than the height of an automobile, and the other end of which is adjacent such floor, (b) rolling a first automobile onto the floor of the container and then from the floor of the container onto said ramp, (c) lifting said other end of said ramp bearing said first automobile to and securing it in a generally horizontal position, (d) rolling a second automobile onto the floor of the container under said ramp bearing said first automobile; and (e) repeating steps (a) through (d) sequentially to the other end of the container to fill the container with stacks of two automobiles each.

2. The method of claim 1, including:

(e) placing at least one auxiliary ramp with an inclined surface under said other end of said inclined ramp before performing step (b), and (f) removing said auxiliary ramp before performing forming step (d).

3. The method of claim 1, including:

(e) securing said first automobile to said rack.

4. The method of claim 1, including:

(e) securing said second automobile to the floor of the container.

5. The method of unloading automobiles supported one on a tiltable ramp over the other on the floor in a plurality of stacks in a shipping container, comprising:

(a) rolling the lower automobile out from under the upper automobile in the last stack at one end of and out of the container, (b) lowering one end of the ramp of the last stack to the floor of the container, (c) rolling the upper automobile down the ramp and out of the container, and (d) removing the ramp from the container.

6. The method of claim 5, including:

(e) repeating steps (a) through (d) sequentially to the other end of the container to empty the container of automobiles.

7. An automobile rack for use in loading automobiles into a standard intermodal, dry cargo shipping container, comprising:

(a) a pair of upright, opposed sidewall frames spaced apart approximately the inside width of the container and more than the width of an automobile, and extending vertically more than the height of an automobile, (b) an elongated ramp adapted to support the wheels of an automobile and hingedly connected at one end to the upper portions of said frames between the same for swinging between an inclined position in which an automobile may be driven up said ramp from the floor of a container and a generally horizontal position at the upper portion of said frames, and (c) locking means at the other end of said ramp for securing said ramp in said horizontal position.

8. The rack of claim 7, including:

(d) elongated tracks on said ramp spaced apart the track width of an automobile to be supported thereon and extending greater than the wheelbase length of such automobile, and (e) wedge-shaped auxiliary ramps on the floor of the container, supporting said other end of said ramp, and in general continuation of said tracks.

9. The rack of claim 7, in which: (d) said ramp is symmetrical about both longitudinal and transverse horizontal axes, and (e) said locking means are at both ends of said ramp.

10. The rack of claim 7, in which:

(e) the rack is symmetrical about its transverse axis.

* * * * *